(12) United States Patent
Wang et al.

(10) Patent No.: US 6,913,639 B2
(45) Date of Patent: Jul. 5, 2005

(54) SURFACE FUNCTIONALIZATION OF PIGMENTS AND/OR DYES FOR RADIATION CURABLE INK PRINTING AND COATING APPLICATIONS

(75) Inventors: Zhikai Wang, Roswell, GA (US); Bin Wu, Marietta, GA (US)

(73) Assignee: Surface Specialties, S.A., Brussels (BE)

( * ) Notice: Subject to any disclaimer, the term of this patent is extended or adjusted under 35 U.S.C. 154(b) by 0 days.

(21) Appl. No.: 10/450,270

(22) PCT Filed: Dec. 10, 2001

(86) PCT No.: PCT/US01/47241

§ 371 (c)(1),
(2), (4) Date: Oct. 17, 2003

(87) PCT Pub. No.: WO02/48272

PCT Pub. Date: Jun. 20, 2002

(65) Prior Publication Data

US 2004/0050299 A1 Mar. 18, 2004

Related U.S. Application Data

(63) Continuation-in-part of application No. 09/736,129, filed on Dec. 15, 2000, now abandoned.

(51) Int. Cl.[7] .......................... C08K 5/06; C09D 11/00

(52) U.S. Cl. .................... 106/31.27; 106/31.6; 106/499

(58) Field of Search ............................. 106/31.27, 31.6, 106/499

(56) References Cited

U.S. PATENT DOCUMENTS

| | | | |
|---|---|---|---|
| 4,087,402 A | 5/1978 | Monte et al. | 106/447 |
| 4,622,073 A | 11/1986 | Hashizume et al. | 106/403 |
| 4,877,604 A | 10/1989 | Schlossman | 424/63 |
| 5,356,617 A | 10/1994 | Schlossman | 424/401 |
| 5,558,705 A | 9/1996 | Keemer et al. | 106/403 |
| 6,605,635 B1 * | 8/2003 | Bai et al. | 514/422 |
| 6,656,990 B2 * | 12/2003 | Shustack et al. | 524/430 |

* cited by examiner

*Primary Examiner*—Anthony J. Green
(74) *Attorney, Agent, or Firm*—Wenderoth, Lind & Ponack, L.L.P.

(57) ABSTRACT

Functionalized pigment compositions produced by reacting a radiation reactive organ metallic coupling agent with a pigment/dye.

11 Claims, 1 Drawing Sheet

Figure 1. Flow Test: bis phenol A epoxy diacrylate blended with a multifunctional acrylated monomer +NZ33 (0.2%)
Figure 2. Flow Test: bis phenol A epoxy diacrylate blended with a multifunctional acrylated monomer +NZ33 (0.5%)

SURFACE FUNCTIONALIZATION OF PIGMENTS AND/OR DYES FOR RADIATION CURABLE INK PRINTING AND COATING APPLICATIONS

This is a 371 of PCT/US01/47241, filed Dec. 10, 2001 which is a CIP of Ser. No. 09/736,129, filed Dec. 15. 2000, now abandoned.

BACKGROUND OF INVENTION AND PRIOR ART

This invention relates to surface functionalization of pigments and/or dyes for radiation curable ink printing and coating applications.

In general, printing inks and coating materials can be classified in four categories: solvent-based, water-based, radiation-curable and powder materials. The compatibility between pigments/dyes and organic resins (as coating matrix or printing vehicles) is one of the most crucial factors affecting not only processability but also performance in both coating and ink printing industries. Pigments/dyes that are used in non-polar environments must be readily dispersible, and therefore hydrophobic. In contrast, pigments that are used in polar environments must exhibit highly polar surface characteristics. In the extreme cases of water-borne inks or coatings, the degree of polarity may need to be fully hydrophilic.

It is important to be able to render desired surface characteristics that can match the polarity of resins and diluents (solvents or water). Pigment/dye surface modification has been a challenge for a long time.

It is well known, for example, to use surfactants to improve the dispersibility of pigments, but the utility of such a process is usually limited. Short shelf life or relatively poor thermal stability of the pigment/dye dispersion is a main concern. An invention described in U.S. Pat. No. 5,808,118 relates to a surfactant consisting of the product of the simultaneous reaction of a sulfonic acid, a saturated fatty acid and a polyamine. The advantage of this invention is to provide better dispersion stability.

Organic silanes and silicone oligomers have been extensively employed as coupling agents in surface modification for various inorganic pigments such as transition metal oxides (U.S. Pat. Nos. 6,120,596, 5,665,155, 4,404,318, 5,719,206, 5,820,977, EP 0725115 WO 00/04421, WO 99/57204, etc.). Various hydrophobic groups were attached on the pigment surface through covalent bonds. The major limitation of this method is that no coupling reaction will take place between the organic silanes and the surface of pigments/dyes if there are no hydroxyl groups on the surface of the pigments/dyes.

A method for making a non-polar suspension of charged pigment particles is illustrated in WO 00/05313. In this method, a covalent bond is formed between the pigment and the surface modifying polymers which have one of the following groups: carboxyl, hydroxyl, anhydrido, amino, amido, halo, thiol, epoxy, keto, aldehydo, isocyanato, and alkenyl. Pigments can also be treated with nitrogen-containing copolymer of a variety of polyurethanes (U.S. Pat. No. 4,844,742).

Hydrophilic characteristics of pigment surface are provided in various ways. Organic pigments and transition metal containing pigments (hydrophobic) can be treated in phosphoric acid and/or its monoester (U.S. Pat. Nos. 5,865, 885, 5,466,482 EP 0717085). Magnetic pigments can be surface treated in one or more aralkylphosphonic acids (U.S. Pat. No. 6,099,895). Pigments can be surface coated by mixing titanium oligomers and organic acid esters (EP 568720).

The mechanisms of chemical and physical adsorption are often used for pigment/dye surface treatments, although these types of links are not as stable as covalent bonds. Zinc oxide powder can be immersed in one or more organic liquids selected from alcohols, ketones, amines and esters (U.S. Pat. No. 5,672,427). Pigments can also be treated with poly (vinyl alkyl ether)s (EP 0500494)

In the U.S. Pat. No. 4,622,073, metal powder pigment is treated with an organic titanate having the general formula: $Ti(OR)_2[OC_2H_4N(C_2H_4OH)_2]_2$ wherein R is alkyl group of 1 to 8 carbon atoms. In the U.S. Pat. No. 4,080,353, pigment is treated with titanate-phosphite adducts which are the reaction products of $(RO)_4Ti$ and di-substituted hydrogen phosphite $(R'O)_2P(O)H$ where R and R' are monovalent alkyl, alkenyl, aryl, aralkyl or alkaryl.

Radiation (UV/electron beam) curable printing inks and coatings have become very well accepted technologies because their distinct advantages including low or non VOC, fast process, high performance, etc. However, formulating ink and coating materials is a challenge because of the poor compatibility between UV-resins and pigments/dyes, and therefore, poor dispersibility and wetting ability. None of above cited literature/patents has disclosed any method addressing this issue.

SUMMARY OF THE INVENTION

The present invention relates to a method to surface functionalize both inorganic and organic pigments and dyes. In the functionalization reactions, organic titanate and zirconate and aluminate compounds are employed as coupling agents, more exactly, as a molecular bridge at the interface between two dissimilar phases, such as inorganic/organic or immiscible organic/organic phases.

The coupling agent is represented by the formula:

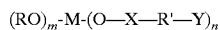

where, M is a metal atom selected from the groups consisting of Group IIa, IIIb, IVb, Vb, VIb, VIIb, VIII, Ib, IIb, and IIIa and preferably, Ti, Zr, or Al, RO is a hydrolyzable portion, or proton-bearing moiety and R is $C_1$ to $C_8$ substituted or unsubstituted alkyl or hydrogen, X is an organic functional group such as alkylates, carboxyl, sulfonyl, phenolic, phosphate, pyrophosphate, or phosphite etc.

R' is an organic group such as $C_2$ to $C_8$ alkyl or substituted alkyl, which provides van der Waals' entanglement via long carbon chains for a variety of mechanical properties.

Y represents a radiation curable functional group, such as, but not limited to acrylate, methacrylate epoxy, and vinyl as well as other unsaturated groups, m varies from 1–3 and n is 1–3.

Depending upon the structure of the interface of the dissimilar phases, and also, upon the type of the coupling agents employed, the coupling mechanisms fall into one or more of the following categories: alcoholysis (condensation), surface chelation, coordination, ligand exchange, chemical adsorption.

In the present invention, surface functionalization of pigments/dyes provides not only the desired surface characteristics to satisfy the compatibility requirements for pigments/dyes and resin matrix, but also radiation (UV light or electron beam) reactivity. Therefore, the surface functionalization provides the capability of co-polymerization between pigments/dyes and matrix resins in the later radiation cure process.

Suitable resins to be admixed with functionalized pigments include powdered resins such as polyesters or epoxy resins.

Liquid monomers and oligomers such as acrylates, methacrylates, epoxies or vinyls may also be admixed with the functionalized pigments/dyes and then are subjected to radiation curing.

The functionalizing or coupling agents may first be added to the resins (oligomers, monomers or polymers), and pigments/dyes. Other additives may be added to the mixture later.

The amount of coupling agent is generally based on the reactivity of coupling agent, surface morphology of pigments/dyes as well as the desired properties of the formulation such as the desired flow rate for inks, etc.

The present invention makes the dispersion/grinding process easier, and therefore, reduces the process cost.

The present invention enhances the performance in either coatings or printing inks in many aspects. The Theological behaviors of uncured materials including melt powder-coating materials, pigmented coating materials and inks are significantly improved. These improvements directly result in the better coating and printing processability. The performance enhancements of cured pigmented coatings/inks may include surface hardness, modulus, flexibility, elongation strength, adhesion to substrate, chemical and corrosion resistance. These enhancements and improvements are believed to be the result of the high compatibility between matrix resins and modified pigments/dyes. The surface functionalization reactions provide a variety of radiation-curable functionalities, such as (meth) acrylate, epoxy etc, which are similar to, even the same as that of resin matrix. More essentially, these enhancements and improvements are the result of the unique structure of cured ink films/coatings, i.e. homogeneously distributed pigments/dyes that are chemically bonded to resin matrix.

BRIEF DESCRIPTION OF THE DRAWINGS

FIGS. 1 and 2 depict flow tests of inks employing the functionalized pigments of the present invention vs. the control.

DETAILED DESCRIPTION OF INVENTION

Two examples are presented here to demonstrate that this invention can be used in two completely different application areas.

EXAMPLE 1

Property Improvement for Radiation Curable Powder Coatings

Materials
1. UVECOAT 2000, a UV powder-coating resin produced by UCB Chemical Corporation.
2. Ti-Pure R-960, $TiO_2$ Pigment from Du Pont, was used as received.
3. NZ-39, neopentyl(diallyl)oxy triacryl zirconate, a coupling agent obtained from KenRich Petrochemicals Inc, was used as received.
4. Reflow P-67, a flowing agent from Estron Chemical, was used as received.
5. Oxymelt A-4, a degassing agent from Estron Chemical, was used as received.
6. RX-05613, a $TiO_2$ functionalized with acrylate functional groups. The coupling agent used was NZ-39.

The following is a generalized procedure for making a functionalized nanoparticle, such as RX-05613:

In a three-neck flask, is dispersed certain amount of a commercial grade nanoparticle (e.g. $Al_2O_3$) in powdered form in methanol by agitating for one hour. The weight ratio of methanol to the nanoparticle is approximately 20–50:1. A certain amount of NZ-39 was dissolved in methanol. The amount of NZ-39 is between 0.1 and 0.5% by weight of that of the nanoparticle. With agitation, the NZ-39/methanol solution was added dropwise to the nanoparticle dispersion. The content in the three-neck flask was transferred to a single neck flask. The mixture was refluxed in the single neck flask at 40–60° C. for approximately 2 hours. The reflux temperature depends on the type of surface modifiers. Methanol was allowed to evaporate. The product was dried at 110° C. for 24 hours.

7. Rubine Pigmet, an organic pigment obtained from Ciba
8. TMPEOTA, trimethylolpropane ethoxy triacrylate monomer produced by UCB.
9. DPGDA, dipropylene glycol diacrylate monomer produced by UCB.
10. I369, a benzophenone derivative obtained from Ciba.
11. ITX, isopropylthioxanthone, obtained from First Chemicals.
12. EPD, a benzophenone derivative obtained from Quantacure.
13. BDK, a benzophenone derivative obtained from Chemfirst Fine Chemicals.
14. MEHQ, an inhibitor obtained from Kodak.

Test Methods
1. Distinctness of image (DOI): The procedure is listed in Instruments for Research and Industry Application Data Sheet included with the Model GB 11-DOI Glow Box.
2. Pencil Hardness was measured according to ASTM D 3363. Pencil Scratch and Gouge Hardness were measured.
3. 60° and 20° gloss and haze were measured on a BYK-Gardner Haze-Gloss Meter.
4. Methyl ether ketone (MEK) resistance was measured as MEK double rubs in accordance with ASTM D 4752.

Melt Blending for Radiation Curable Powder Coating Systems:

3,000 g of UVECOAT 2000 was transferred to a 10-liter round-bottom flask. The resin was heated to 140–180° C. until completed melted. The temperature was maintained at 140–180° C. while the molten resin was stirred. Appropriate amount of a nanoparticle of double bond functionality was added into the flask. The resin and nanoparticle mixture was stirred at 140–180° C. for one hour before poured into an aluminum pan.

Melt Extrusion for Radiation Powder Coating Systems:

All ingredients of a radiation curable powder formulation including the resin, photoinitiator, pigment, degassing agent, and a certain type of reactive nanoparticle were mixed in a Prism Pilot 3 High-Speed Premixer. Premix speed was 2000 RPM and total mixing time was 4 minutes. The premixed mixture was then extruded in a Prism 16 PC twin screw extruder at approximately 110° C. The extrudate was cooled at −30° C. for 24 hours. The cooled flakes were pulverized in a Brinkmann high-speed grinder, sieved with a 140-mesh sieve into the final powder. The powder was applied electrostatically onto aluminum, steel or MDF substrates. The panels were cured under UV or EB lights with appropriate heating (e.g. an IR light).

Results and Discussion

Table 1 shows two UV powder formulations, U1 and U2. U1 is a standard formulation based on UVECOAT 2000 and U2 contains 4% of RX 05613, a functionalized pigment with methacrylate functional groups attached on the surface.

As can be seen from Table 2, appearance, surface hardness and solvent resistance were all improved by the addition of RX 05613.

TABLE 1

Formulation of UV Powder Coatings

| Formulation No. | Resin wt % | Photoinitiator wt % | Pigment Wt % | Surface-Modified Pigments wt % | Degassing Agent wt % |
|---|---|---|---|---|---|
| U1 | UVECOAT 2000 | IRGACURE 819 | $TiO_2$ | — | |
| | 72.1 | 3.5 | 24.0 | | 0.4 |
| U2 | UVECOAT 2000 | IRGACURE 819 | $TiO_2$ | $TiO_2$ RX 05613 | |
| | 72.1 | 3.5 | 20.0 | 4.0 | 0.4 |

TABLE 2

Properties of UV Curable Powder Coatings

| Formulation Number | | U1 | U2 |
|---|---|---|---|
| Gloss | 60° | 95.0 | 99.0 |
| | 20° | 84.0 | 92.0 |
| Haze | | 99.0 | 40.0 |
| DOI | | 50 | 60 |
| Pencil Hardness | scratch gauge | F 2 H | 3 H 4 H |
| MEK double rubs | | 65 | 140 |

EXAMPLE 2

Radiation Curable Ink Printing Application

NZ 33, neopentyl(diallyl)oxy trimethacryl zirconate, is a product from KenRich Petrochemicals Inc. This coupling agent with a UV-curable methacrylate functional group is usually employed in the surface functionalization reaction of carbon black, cyan, rubine and yellow pigments. The molecular structure is represented as follows:

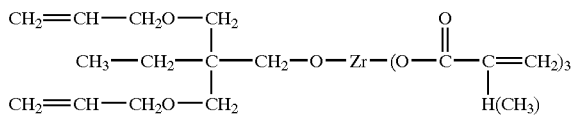

The functionalized pigments/dyes not only are compatible with vehicle resins, which are (meth) acrylate monomers/oligomers, but also co-polymerizable with these vehicle resins in UV-cure processes.

Improved compatibility of pigments/dyes with vehicle resins and also their copolymerization capability render various benefits for ink printing applications. As a result, the rheology of the ink materials, adhesion of cured inks to substrates, surface properties of cured inks such as surface hardness, flexibility, chemical resistance, water resistance, corrosion resistance and weathering-ability, etc., are all improved.

In the preparation of ink, bis phenol A epoxy diacrylate blended with a multifunctional acrylated monomer and the coupling agents were manually blended together and dispersed for 15 minutes using a Premier Mill Dispersator dispersion mill. These well-mixed blends of resins and coupling agent were used as vehicle resins. The vehicle resins were manually blended with the four pigments (30% black, rubine, cyan, and yellow) and then passed through the three-roll mill to make a pigment-concentrate. The pigment-concentrate was passed through the three-roll mill and tested using a Hegman grind scale after each pass. If the Hegman grind scale does not show any scratches, then the milling is terminated. If scratches are present, then the pigment-concentrate is passed through the mill repeatedly until no scratches are observed. The Hegman grind scale is used for checking the particle size in a pigment-concentrate without having to dilute the paste. The sample concentrate is tested as it comes from the grinding mill. It can be found that reading the gauge has been reduced to the simple task of observing where the coarse particles present a definite scratch in the concentrate matrix. The Hegman scale is the most common one used in the paint industry.

Several positive results are summarized below.

1. FIG. 1 shows a comparison of the ink flow of the control (sample A) versus that of sample C. The control (see Table 4) was the Rubine pigmented-mixture of a bis phenol A epoxy diacrylate and a multifunctional acrylated monomer. Sample C was formulated with a bis phenol A epoxy diacrylate+a multifunctional acrylated monomer+Rubine pigment+NZ33 at a loading level of 0.1% (see Table 5). FIG. 2 shows a comparison of the ink flow of the control versus sample E. Sample E was formulated with a bis phenol A epoxy diacrylate+a multifunctional acrylated monomer+Rubine pigment+NZ33 at 0.6% (see Table 6). These figures clearly show that the addition of the Ken Rich additives (NZ33 and NZ39) improve the flow of the final ink.

2. The control of cyan pigment-ink showed only a small amount of flow off the mill. This control ink was a mixture of cyan pigments and a bis phenol A epoxy diacrylate blended with a multifunctional acrylated monomer. In comparison, the sample cyan pigment-ink, which was a blend of cyan pigments, a bis phenol A epoxy diacrylate, a multifunctional acrylated monomer, and the NZ33 coupling agent, flowed very well off the mill. Generally, inks that demonstrate good flow exhibit superior printing performance. In a flexographic printing process, for example, ink transfer is directly related to ink flow, and the transfer of ink from the anilox cells to the printing plate is at its best when there is good flow. Good flow usually offers high print quality. Moreover, the better the flow, the wider the printing window, which means one can change the printing speed without having to worry about starvation, spitting or loss of the print quality.

3. The most notable observation came from the milling process of the carbon black pigment. For the control, a bis phenol A epoxy diacrylate blended with a multifunctional acrylated monomer in black pigment, five passes of the pigment concentrate were required to produce a grind with no scratch. However, when the NZ33 agent was added, no scratch was present after one pass through the mill. Therefore, the preparation time for the two inks with the coupling agents was drastically reduced. Since the number of passes through the mill has been reduced, this production efficiency is increased. The economic cost for process is significantly reduced.

4. The gloss measurements have also demonstrated improvements in UV-cured ink film made from the surface-functionalized pigment formulation (see Table 3).

TABLE 3

Gloss Readings from Printed Proofs

| Sample | 20 degrees | 60 degrees |
|---|---|---|
| Control Sample A in FIG. 1 or 2 | 6.1 | 37.1 |
| Sample E in FIG. 2 | 7.2 | 40.9 |

The formulations for inks made in the present invention are listed below.

TABLE 4

Control A, Red Ink Formulation

| Sample Name | Manufacturer | Type | Actual Weight | Weight % |
|---|---|---|---|---|
| bis phenol A epoxy diacrylate blended with a multifunctional acrylated monomer | UCB | epoxy acrylate | 35.0 | 14.0 |
| Rubine Pigment | Ciba | organic pigment | 15.0 | 6.0 |
| TMPEOTA | UCB | multifunctional acrylated monomer | 119.8 | 47.9 |
| DPGDA | UCB | multifunctional acrylated monomer | 48.0 | 19.2 |
| I369 | Ciba | benzophenone derivative | 8.0 | 3.2 |
| ITX | First Chemicals | Isopropylthioxanthone | 8.0 | 3.2 |
| EPD | Quantacure | benzophenone derivative | 8.0 | 3.2 |
| BDK | Chemfirst Fine Chemicals | benzophenone derivative | 8.0 | 3.2 |
| MEHQ | Kodak | Inhibitor | 0.2 | 0.1 |
| | | Total | 250.0 | 100.0 |

TABLE 5

Sample C, Red Ink Formulation

| Sample Name | Manufacturer | Type | Actual Weight | Weight % |
|---|---|---|---|---|
| bis phenol A epoxy diacrylate blended with a multifunctional acrylated monomer | UCB | epoxy acrylate | 35.0 | 14.0 |
| NZ33 | Ken Rich Petro-chemical | coupling agent | 0.3 | 0.1 |
| Rubine Pigment | Ciba | organic pigment | 15.0 | 6.0 |
| TMPEOTA | UCB | Multifunctional acrylated monomer | 119.8 | 47.9 |
| DPGDA | UCB | Multifunctional acrylated monomer | 48.0 | 19.2 |
| I369 | Ciba | benzophenone derivative | 8.0 | 3.2 |
| ITX | First Chemicals | Isopropylthioxanthone | 8.0 | 3.2 |
| EPD | Quantacure | benzophenone derivative | 8.0 | 3.2 |
| BDK | Chemfirst Fine Chemicals | benzophenone derivative | 8.0 | 3.2 |
| MEHQ | Kodak | Inhibitor | 0.2 | 0.1 |
| | | Total | 250.3 | 100.0 |

TABLE 6

Sample E Red Ink Formulation

| Sample Name | Manufacturer | Type | Actual Weight | Weight % |
|---|---|---|---|---|
| bis phenol A epoxy diacrylate blended with a multifunctional acrylated monomer | UCB | epoxy acrylate | 35.0 | 13.9 |
| NZ-39 | Ken Rich Petro-chemicals | coupling agent | 1.5 | 0.6 |
| Rubine Pigment | Ciba | organic pigment | 15.0 | 6.0 |
| TMPEOTA | UCB | Multifunctional monomer | 119.8 | 47.6 |
| DPGDA | UCB | Multifunctional monomer | 48.0 | 19.1 |
| I369 | Ciba | benzophenone derivative | 8.0 | 3.2 |
| ITX | First Chemicals | Isopropylthioxanthone | 8.0 | 3.2 |
| EPD | Quantacure | benzophenone derivative | 8.0 | 3.2 |
| BDK | Chemfirst Fine Chemicals | benzophenone derivative | 8.0 | 3.2 |
| MEHQ | Kodak | Inhibitor | 0.2 | 0.1 |
| | | | 251.5 | 100.0 |

We claim:

1. An ink comprising a functionalized pigment composition produced by reacting a radiation reactive organometallic coupling agent with a pigment or dye.

2. The ink according to claim 1, wherein the coupling agent is represented by the formula:

$$(RO)_m\text{-}M\text{-}(\text{—O—X—R'—Y})_n$$

where, M is a metal atom selected from the group consisting of Group IIa, IIIb, IVb, Vb, VIb, VIIb, VIII, Ib, IIb, and IIIa, R is $C_1$ to $C_8$ unsubstituted or substituted alkyl or hydrqgen, X is an organic functional group, R' is an organic group which provides van der Waals' entanglement via carbon chains, Y represents a radiation curable functional group, m varies from 1–3 and n is 1–3.

3. The ink according to claim 1 where M is Ti, Zr or Al.

4. The ink according to claim 1 where X is alkylene, carboxyl, sulfonyl, phenolic, phosphate, pyrophosphate or phosphite.

5. The ink according to claim 1 where R' is a $C_2$ to $C_8$ group.

6. The ink according to claim 1 where Y is an unsaturated group.

7. The ink according to claim 6 where Y is acrylate, methacrylate, epoxy or vinyl.

8. The ink according to claim 1 further comprising a resin powder.

9. The ink according to claim 1 further comprising a powdered resin, liquid monomer or oligomer.

10. The ink according to any of claims 1 to 9 which is radiation curable.

11. An ink comprising a functionalized pigment composition produced by reacting a compound of formula

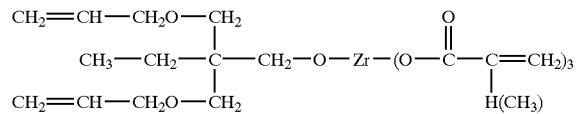

with a pigment or a dye.

* * * * *